United States Patent
Yost

(10) Patent No.: US 11,030,350 B2
(45) Date of Patent: Jun. 8, 2021

(54) SYSTEM, METHOD, AND APPARATUS FOR SECURELY OUTPUTTING SENSITIVE INFORMATION

(71) Applicant: Visa International Service Association, San Francisco, CA (US)

(72) Inventor: Robert Michael Yost, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 190 days.

(21) Appl. No.: 16/204,328

(22) Filed: Nov. 29, 2018

(65) Prior Publication Data

US 2020/0175209 A1    Jun. 4, 2020

(51) Int. Cl.
G06F 21/84 (2013.01)
H04W 4/021 (2018.01)
G06F 21/62 (2013.01)

(52) U.S. Cl.
CPC .......... *G06F 21/84* (2013.01); *G06F 21/6245* (2013.01); *H04W 4/021* (2013.01); *G06F 2221/2111* (2013.01); *G06F 2221/2125* (2013.01)

(58) Field of Classification Search
CPC ............... G06F 21/84; G06F 21/6245; G06F 2221/2125; G06F 2221/2111; G06F 21/6254; H04W 4/021
See application file for complete search history.

(56) References Cited

U.S. PATENT DOCUMENTS

| | | | | |
|---|---|---|---|---|
| 6,157,679 A | * | 12/2000 | Johnson | H04K 1/00 332/103 |
| 6,519,699 B2 | * | 2/2003 | Lu | H04K 1/00 380/28 |
| 6,874,085 B1 | * | 3/2005 | Koo | H04L 63/0428 713/165 |
| 8,225,091 B1 | * | 7/2012 | Pimentel | H04L 63/101 713/165 |
| 8,943,554 B2 | * | 1/2015 | Tran | H04W 4/00 726/4 |
| 9,059,990 B2 | * | 6/2015 | Borovikov | G06F 21/60 |
| 9,553,849 B1 | * | 1/2017 | Smalley | H04L 63/0428 |
| 2004/0093527 A1 | * | 5/2004 | Pering | G06F 21/36 726/5 |
| 2007/0168677 A1 | * | 7/2007 | Kudo | G06F 21/32 713/185 |
| 2007/0274274 A1 | * | 11/2007 | Carothers | H04W 48/20 370/338 |
| 2011/0150002 A1 | * | 6/2011 | Kim | H04L 69/22 370/474 |
| 2011/0302607 A1 | * | 12/2011 | Warrick | H04L 12/2809 725/39 |
| 2013/0254829 A1 | * | 9/2013 | Jakubowski | G06F 21/53 726/1 |

(Continued)

*Primary Examiner* — Matthew Smithers
(74) *Attorney, Agent, or Firm* — The Webb Law Firm

(57) ABSTRACT

Described herein are systems, methods, and apparatuses for securely outputting sensitive information. The systems, methods, and apparatuses may include accessing a data item using a computing device, determining that the data item contains sensitive information, and determining that the computing device is located in a public space. The data item, or a portion thereof, may be modified and the modified data item may be output.

20 Claims, 6 Drawing Sheets

(56) References Cited

U.S. PATENT DOCUMENTS

| | | | |
|---|---|---|---|
| 2014/0068257 A1* | 3/2014 | Burckard | H04L 63/0435 |
| | | | 713/166 |
| 2014/0189135 A1* | 7/2014 | Lawson | H04L 67/141 |
| | | | 709/227 |
| 2016/0140349 A1* | 5/2016 | Brown | G06F 21/84 |
| | | | 713/189 |
| 2017/0149793 A1* | 5/2017 | Spertus | H04L 41/069 |
| 2018/0301793 A1* | 10/2018 | Mitsufuji | H01Q 1/241 |
| 2019/0190890 A1* | 6/2019 | Druker | G06F 21/62 |
| 2019/0214060 A1* | 7/2019 | Goel | H04W 12/02 |

* cited by examiner

| | | Sensitive Data 401 |
|---|---|---|
| Sensitive Data (unmodified): | 123-45-6789 | |
| Format Preserved Modification (complete): | XXX-XX-XXXX | 402 |
| Partial Modification: | XXX-XX-9876 | 403 |
| Complete Hiding: | _____ | 404 |

FIG. 4 ically, the disclosure pertains to the prevention of the unauthorized use of data including prevention of privacy violations or unauthorized data modifications.

SYSTEM, METHOD, AND APPARATUS FOR SECURELY OUTPUTTING SENSITIVE INFORMATION

BACKGROUND

1. Technical Field

This disclosure pertains to information security. More specifically, the disclosure pertains to the prevention of the unauthorized use of data including prevention of privacy violations or unauthorized data modifications.

2. Technical Considerations

Computing technology is ubiquitous, and users often operate computing devices like smartphones, tablets, smart speakers, smart televisions, home control hubs, or portable computers in open and/or public spaces, or in semi-private spaces in the presence of multiple other human entities. Often, such devices are used to access sensitive data, such as account numbers, government/tax identification numbers, account balances, health and medical records, and many other types of sensitive data. While such data may be safeguarded through encryption, passwords, and other known security techniques, the outputting of that data by the user's computing device occurs in a non-secure manner, thus creating a point of vulnerability which may result in such data being observed or intercepted by unintended human entities in physical proximity to the device's output. What is needed is a way to determine that data is sensitive, determine that a device is being operated in a public space, and then take actions to hide, obfuscate, mask, securely output, or otherwise modify such sensitive data and output only such modified sensitive data.

SUMMARY

Non-limiting embodiments or aspects of the disclosure are directed to systems, methods, and apparatuses for determining that certain data intended for output is sensitive, determining that a computing device is being operated in a public space, and hiding, obfuscating, masking, or otherwise modifying sensitive data, all without the involvement of, or intervention by, human actors. Benefits of the non-limiting embodiments or aspects disclosed herein include ensuring that sensitive data is not inadvertently or intentionally observed or received by others in proximity of the computing device or its output.

According to some non-limiting embodiments or aspects, provided is a method for securing output comprising accessing, by a computing device, a data item; determining, by at least one processor, that the data item contains sensitive information; determining, by at least one processor, based on at least one input to the computing device, that the computing device is located in a public space; modifying, by at least one processor, at least a portion of the data item to generate a modified data item; and outputting, by the computing device, the modified data item.

In some non-limiting embodiments or aspects, the step of outputting, by the computing device, the modified data item comprises displaying the modified data item on a user interface, audibly reciting the modified data item on a speaker, printing the modified data item using a printer, or any combination thereof.

In some non-limiting embodiments or aspects, the step of determining, by the at least one processor, that the data item contains sensitive information comprises analyzing a metadata item associated with the data item, comparing the format of the data item to a recognized sensitive information format, or any combination thereof.

In some non-limiting embodiments or aspects, the computing device comprises at least one of the following: the at least one processor determining that the data item contains sensitive information; the at least one processor determining, using at least one input to the computing device, that the computing device is located in a public space; and the at least one processor modifying at least a portion of the data item to generate a modified data item; or any combination thereof.

In some non-limiting embodiments or aspects, the computing device comprises at least one of the following: the at least one processor determining that the data item contains sensitive information; the at least one processor determining, using at least one input to the computing device, that the computing device is located in a public space; the at least one processor modifying at least a portion of the data item to generate a modified data item, or any combination thereof, is arranged in a remote server in communication with the computing device.

In some non-limiting embodiments or aspects, the at least one input to the computing device comprises sound data, image data, network data, location data, or any combination thereof.

In some non-limiting embodiments or aspects, the at least one input to the computing device is obtained by at least one of the following: a microphone, a camera, a wireless radio, a location module, or any combination thereof.

In some non-limiting embodiments or aspects, the step of determining, by the at least one processor, that the computing device is located in the public space further comprises: applying at least one of a plurality of mathematical weights to each of the at least one input to generate weighted inputs; and comparing the sum of the weighted inputs against a threshold.

In some non-limiting embodiments or aspects, the step of determining, by the at least one processor, that the computing device is located in the public space further comprises detecting a human entity in a proximity to the computing device.

In some non-limiting embodiments or aspects, the method further comprises determining, by the at least one processor, that the human entity is not a trusted user of the computing device.

In some non-limiting embodiments or aspects, the method further comprises receiving, by the computing device, a user command to output the sensitive information; and outputting, by the computing device, the sensitive information.

In some non-limiting embodiments or aspects, the step of modifying, by the at least one processor, the at least a portion of the data item is performed by a server.

In some non-limiting embodiments or aspects, the step of determining, by the at least one processor, that the data item contains sensitive information is performed by a server.

According to some non-limiting embodiments or aspects, provided is a system for securing output comprising a computing device; and a server configured to: receive, from the computing device, a request for data associated with a user of the computing device, wherein the request includes an indication that the computing device is located in a public space; retrieve the data from a memory; determine that the data includes sensitive information; modify at least one portion of the sensitive information to generate modified data when the request includes the indication that the computing device is located in the public space; and send the modified data to the computing device; wherein the computing device is configured to: determine that the computing device is located in the public space; send, to the server, the request for the data that is associated with the user of the computing device; receive the modified data from the server; and output the modified data.

In some non-limiting embodiments or aspects, the output of the modified data comprises displaying, on a user interface, the modified data.

In some non-limiting embodiments or aspects, the output of the modified data comprises audibly playing, on a speaker, the modified data.

In some non-limiting embodiments or aspects, the modified data is generated by hiding, obfuscating, masking, or any combination thereof the at least one portion of the sensitive information.

In some non-limiting embodiments or aspects, the computing device is further configured to detect, based on one or more inputs to the computing device, a human entity, and wherein the one or more inputs comprise sound data, image data, network data, location data, or any combination thereof.

According to some non-limiting embodiments or aspects, provided is a computing device comprising a processor; an input device; a memory including instructions that when executed by the processor cause the computing device to: receive a request to output data; determine that the data contains sensitive information; analyze an input received through the input device to determine that the computing device is in a public space; and securely output the sensitive information.

In some non-limiting embodiments or aspects, the input device comprises a microphone, a camera, a wireless radio, a location module, or any combination thereof, and the step of securely outputting the sensitive information comprises adjusting the visibility of a display.

Further non-limiting embodiments or aspects are set forth in the following numbered clauses:

Clause 1: A method for securing output, comprising: accessing, by a computing device, a data item; determining, by at least one processor, that the data item contains sensitive information; determining, by at least one processor, based on at least one input to the computing device, that the computing device is located in a public space; modifying, by at least one processor, at least a portion of the data item to generate a modified data item; and outputting, by the computing device, the modified data item.

Clause 2: The method of clause 1, wherein the step of outputting, by the computing device, the modified data item comprises displaying the modified data item on a user interface, audibly reciting the modified data item on a speaker, printing the modified data item using a printer, or any combination thereof.

Clause 3: The method of clauses 1 or 2, wherein the step of determining, by the at least one processor, that the data item contains sensitive information comprises analyzing a metadata item associated with the data item, comparing a format of the data item to a recognized sensitive information format, or any combination thereof.

Clause 4: The method of any of clauses 1-3, wherein the computing device comprises at least one of the following: the at least one processor determining that the data item contains sensitive information; the at least one processor determining, using at least one input to the computing device, that the computing device is located in a public space; the at least one processor modifying at least a portion of the data item to generate a modified data item; or any combination thereof.

Clause 5: The method of any of clauses 1-4, wherein at least one of the at least one processors is arranged in a remote server in communication with the computing device.

Clause 6: The method of any of clauses 1-5, wherein the at least one input to the computing device comprises sound data, image data, network data, location data, or any combination thereof.

Clause 7: The method of any of clauses 1-6, wherein the at least one input to the computing device is obtained by at least one of the following: a microphone, a camera, a wireless radio, a location module, or any combination thereof.

Clause 8: The method of any of clauses 1-7, wherein the step of determining, by the at least one processor, that the computing device is located in the public space further comprises: applying at least one of a plurality of mathematical weights to each of the at least one input to generate weighted inputs; and comparing a sum of the weighted inputs against a threshold.

Clause 9: The method of any of clauses 1-8, wherein the step of determining, by the at least one processor, that the computing device is located in the public space further comprises detecting a human entity in a proximity to the computing device.

Clause 10: The method of any of clauses 1-9, further comprising determining, by the at least one processor, that the human entity is not a trusted user of the computing device.

Clause 11: The method of any of clauses 1-10, further comprising: receiving, by the computing device, a user command to output the sensitive information; and outputting, by the computing device, the sensitive information.

Clause 12: The method of any of clauses 1-11, wherein the step of modifying, by the at least one processor, the at least a portion of the data item is performed by a server.

Clause 13: The method of any of clauses 1-12, wherein the step of determining, by the at least one processor, that the data item contains sensitive information is performed by a server.

Clause 14: A system for securing output, comprising: a computing device; and a server configured to: receive, from the computing device, a request for data associated with a user of the computing device, wherein the request includes an indication that the computing device is located in a public space; retrieve the data from a memory; determine that the data includes sensitive information; modify at least one portion of the sensitive information to generate modified data when the request includes the indication that the computing device is located in the public space; and send the modified data to the computing device; wherein the computing device is configured to: determine that the computing device is located in the public space; send, to the server, the request for the data that is associated with the user of the computing device; receive the modified data from the server; and output the modified data.

Clause 15: The system of clause 14, wherein the output of the modified data comprises displaying, on a user interface, the modified data.

Clause 16: The system of clauses 14 or 15, wherein the output of the modified data comprises audibly playing, on a speaker, the modified data.

Clause 17: The system of any of clauses 14-16, wherein the modified data is generated by hiding, obfuscating, masking, or any combination thereof, the at least one portion of the sensitive information.

Clause 18: The system of any of clauses 14-17, wherein the computing device is further configured to detect, based on one or more inputs to the computing device, a human entity, and wherein the one or more inputs comprise sound data, image data, network data, location data, or any combination thereof.

Clause 19: A computing device comprising: a processor; an input device; a memory including instructions that when executed by the processor cause the computing device to: receive a request to output data; determine that the data contains sensitive information; analyze an input received through the input device to determine that the computing device is in a public space; and securely output the sensitive information.

Clause 20: The computing device of clause 19, wherein the input device comprises a microphone, a camera, a wireless radio, a location module, or any combination thereof, and wherein the step of securely outputting the sensitive information comprises adjusting visibility of a display.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

FIG. 4 depicts multiple illustrative non-limiting examples of securing sensitive data for output.

DETAILED DESCRIPTION

Figure 1A:
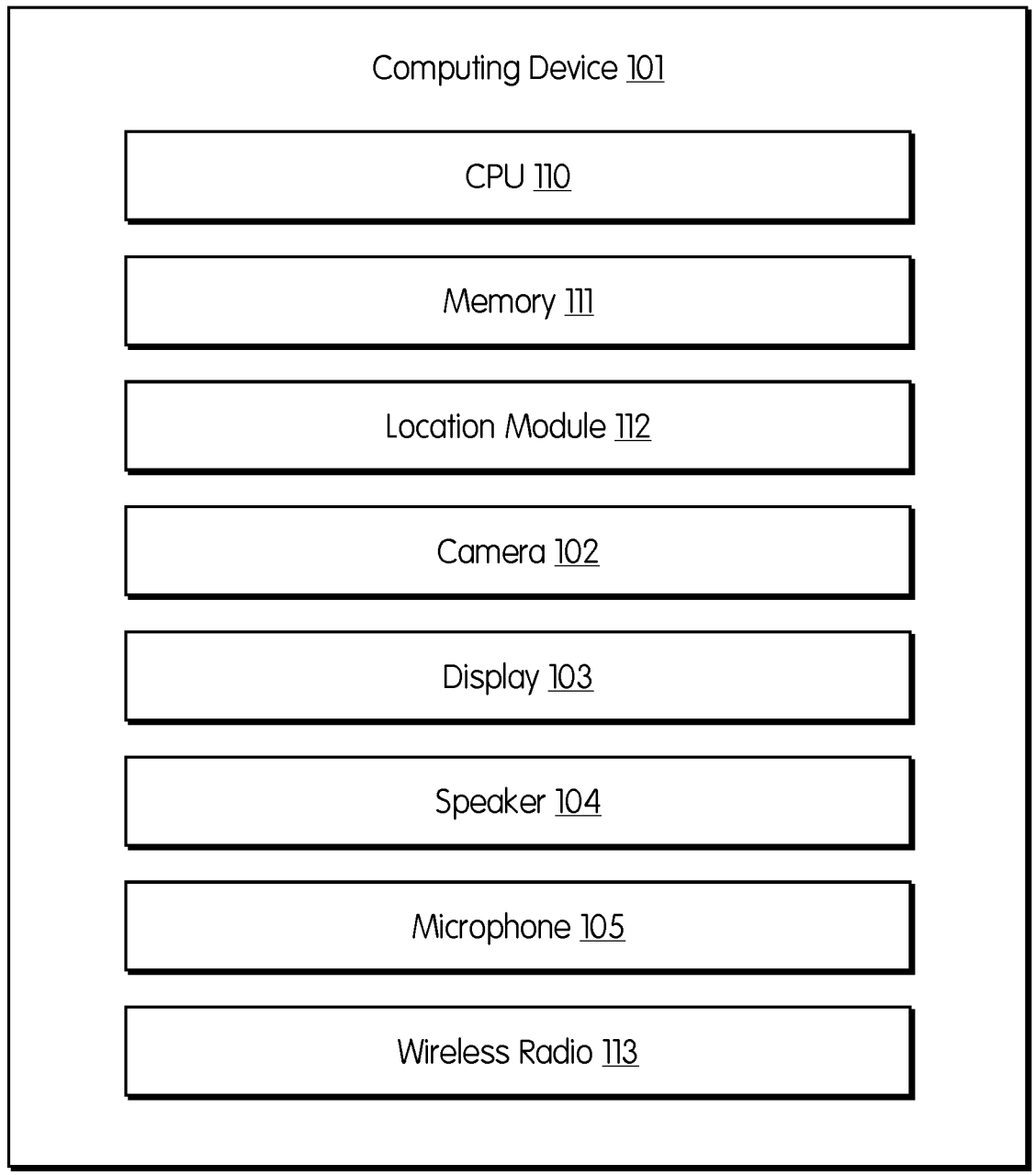
FIG. 1a depicts aspects of elements that may be present in a computing device configured to implement a system, method, and/or process in accordance with some non-limiting embodiments or aspects of the present disclosure.

In the following description, various non-limiting embodiments or aspects will be described. For purposes of explanation, specific configurations and details are set forth in order to provide a thorough understanding of some non-limiting embodiments or aspects. However, it will also be apparent to one skilled in the art that the non-limiting embodiments or aspects may be practiced without the specific details. Furthermore, well-known features may be omitted or simplified in order not to obscure the non-limiting embodiments or aspects being described. Prior to discussing non-limiting embodiments or aspects of the disclosure, description of some terms may be helpful in understanding these non-limiting embodiments or aspects.

As used herein, the term "communication" and "communicate" refer to the receipt or transfer of one or more signals, messages, calls, commands, or other type of data. For one unit (e.g., any device, system, or component thereof) to be in communication with another unit means that the one unit is able to receive data from and/or transmit data to the other unit. A communication may use a direct or indirect connection and may be wired and/or wireless in nature. Additionally, two units may be in communication with each other even though the data transmitted may be modified, processed, routed, etc., between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "computing device" may refer to one or more electronic devices that are configured to directly or indirectly communicate with or over one or more networks. The computing device may be a client device, a mobile device, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "modification" or "modifying" sensitive data may refer to any suitable technique for altering sensitive data such that it is not wholly revealed, and may include hiding, masking, obfuscating, tokenizing, encrypting, randomizing, or otherwise changing some or all of the sensitive data to create a new string of numbers, letters, or other characters such that the resulting string, if observed, received, or intercepted by an unintended party, would not result in immediate compromise or knowledge of the underlying sensitive data.

As used herein, the term "public space," "public place," or a "public setting" may refer to a physical location at which other human entities are present, proximate to, or otherwise capable of hearing or observing activity such that a user in that particular location may not have absolute privacy.

As used herein, the term "server" may include one or more computing devices, which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

"Sensitive information" or "sensitive data" may include any information that is private or secret in nature, which, if compromised could be used by unauthorized parties to access accounts, funds, and credit associated therewith, health or tax information, or, may also include information, which, if revealed to others, might result in embarrassment or concern. Sensitive information may also include personally identifiable information, account numbers, an account balance, an identification number, a password, a PIN, or a photograph.

Turning now to the figures, FIG. 1a depicts aspects of elements that may be present in a computing device 101 configured to implement a system, method, and/or process in accordance with some non-limiting embodiments or aspects of the present disclosure. In some non-limiting embodiments or aspects, computing device 101 may be a smartphone, portable computer, smart-watch or other wearable, smart speaker, smart television, or other similarly equipped computing device.

Computing device 101 may contain at least one input device, some non-limiting examples of which include a camera 102, a microphone 105, a location module 112, or a wireless radio 113. Examples of the type of inputs that may be obtained through such input devices include sound data, image data, network data, or location data. Computing device 101 may utilize one or more input devices, alone or in combination, to determine whether computing device 101 is located in a public space. In some non-limiting embodiments or aspects, computing device 101 may activate camera 102 to capture an image of the environment in which computing device 101 is being operated. This captured image may then be analyzed by a central processing unit ("CPU") 110 contained within in computing device 101 or alternatively, located in a remote server to determine that computing device 101 is being operated in a public space through image recognition of the space itself, the individuals proximate to computing device 101, or any other pattern or image recognition that indicates that the location is or is not private.

In some non-limiting embodiments or aspects, computing device 101 may activate microphone 105, which may be capable of capturing audible sound proximate to computing device 101. In some non-limiting embodiments or aspects, computing device 101 may use its wireless radio 113 to detect the presence of other devices in proximity, which, in the case of detected smartphones, may be indicative of the presence of other human entities. In some non-limiting embodiments or aspects, computing device 101 may receive input from location module 112, which may be a Global Navigation Satellite System ("GNSS") or Global Positioning System ("GPS") chip capable of obtaining or calculating geographical location information. Such location information may be used alone or in combination as an indicator of the location in which computing device 101 is being operated to enable a determination of whether computing device 101 is in a public space. It should be appreciated by persons of skill in the art that a private space can become public if additional human entities or other actors enter that space, and therefore, the determination of whether a location is a public space may occur once or multiple times.

Computing device 101 may be used to access a data item, some or all of which may include sensitive data. Such information and sensitive data may be stored locally in memory 111, or may reside in a remote server or cloud-based file store, and may be retrieved over a network connection, which in some non-limiting embodiments or aspects may be provided using wireless radio 113. Computing device 101 may also contain one or more output devices, such as display 103 or speaker 104, which can be used to output information, including sensitive data, for consumption by the user of computing device 101. Information may be displayed on display 103 as part of a user interface for reading by the user of computing device 101, or may be recited audibly through speaker 104 so that the user of computing device 101 may hear such information. Computing device 101 may also output data to a printer via a network printer interface (not pictured). It should be appreciated by persons of skill in the art that numerous devices and methods may exist for outputting data.

Figure 1B:
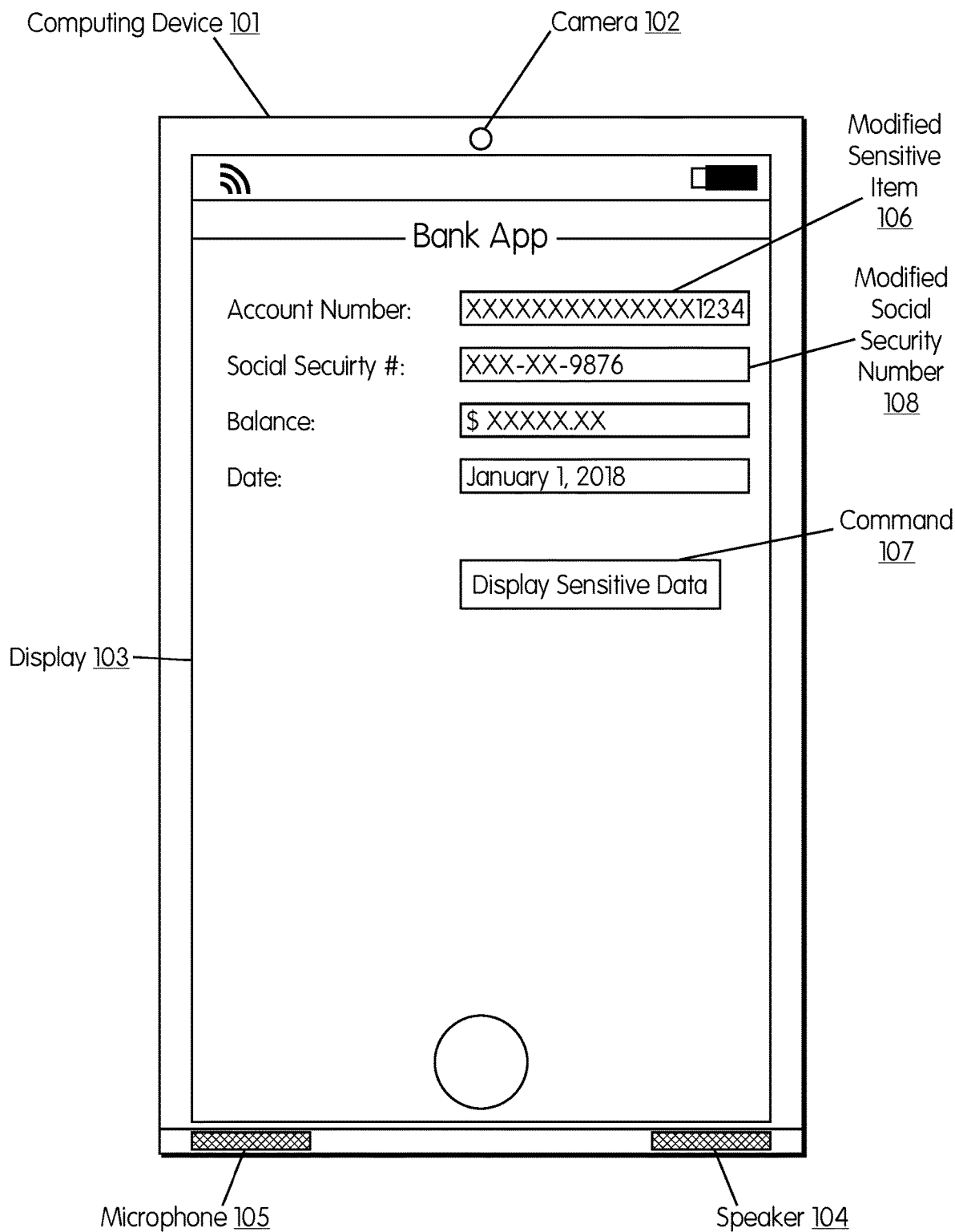
FIG. 1b depicts an illustrative non-limiting example of a computing device outputting modified sensitive data in accordance with some non-limiting embodiments or aspects of the present disclosure.

FIG. 1b depicts an illustrative non-limiting example of a computing device outputting a modified sensitive data item in accordance with some non-limiting embodiments or aspects of the present disclosure. In one non-limiting example, computing device 101 may be used to access a user's financial accounts, resulting in the output of information such as account numbers, balance information, and tax records. In such an example, this information may constitute sensitive data. Upon determining that computing device 101 is being operated in a public space, and the information being accessed or retrieved is sensitive data, such information may be hidden, masked, obfuscated, or otherwise secured for output. In such a non-limiting example, sensitive data can be output as modified sensitive item 106. In some non-limiting embodiments or aspects, such hiding, masking, obfuscation, or securing may be performed by software executing on computing device 101 to create modified sensitive item 106. In yet another non-limiting example, such hiding, masking, obfuscation, or securing may occur on a remote server that retrieves sensitive data such that when this server provides data to computing device 101, it has already been hidden, masked, obfuscated, or otherwise secured for output, as illustrated by modified sensitive item 106.

It should be appreciated by persons of skill in the art that numerous techniques for securely outputting data exist, and that such techniques need not necessarily involve manipulation or modification of sensitive data. In one such non-limiting example, upon determining that computing device 101 is being operated in a public space and that the output of sensitive data is requested, computing device 101 may adjust the visibility of display 103, by dimming its brightness or a back-light associated therewith to render it less visible to unintended observers within a viewing distance. In some non-limiting embodiments or aspects, computing device 101 may dynamically adjust the viewing cone on display 103, such that the angles and directions at which display 103 can be observed by other entities in proximity to computing device 101 is substantially reduced. In some non-limiting embodiments or aspects, computing device 101 may select a different or more secure output mechanism, such as dynamically selecting to output audible sensitive information via headphones instead of using speaker 104 or display 103, given that such output techniques are less likely to be intercepted or observed by unintended recipients.

In another non-limiting example, the user of computing device 101 may be presented with an option to override the automatic outputting of modified sensitive data 106, such as command 107, which, upon execution may output sensitive data in its original unmodified form. In some non-limiting embodiments or aspects, command 107 may be a setting, option, or a set of executable instructions existing in or relating to a particular software application, API, operating system, or user interface, which when enabled or executed, cause computing device 101 to reveal the original sensitive data underlying modified sensitive item 106. In some non-limiting embodiments or aspects, command 107 may execute instructions locally on computing device 101 or on a remote server in order to retrieve and output original sensitive data. Command 107 may also be used to disable alternative secure outputting techniques, such as the dimming or visibility adjustments of/to display 103.

Computing device 101 may employ any of a variety of techniques for determining whether data to be output contains sensitive data. In one non-limiting example, the provider of software applications or web pages used to obtain data may simply indicate that such data is of a sensitive nature. This could occur through the use of metadata tags providing an indicator flag of sensitive data. A computing device 101, or software applications residing thereon, could analyze such a flag prior to outputting data, and could subsequently determine whether to hide, obfuscate, mask, securely output, or otherwise modify such data in a manner such that the underlying sensitive data is not revealed to an unintended observer. In some non-limiting embodiments or aspects, new data types, objects, or data structures could be created which carry a value or "flag," which when set, could be used to indicate that the particular data type, object, or structure contains sensitive data. In some non-limiting embodiments or aspects, such data types, objects, or flags could also carry indicators of the level of sensitivity of the corresponding sensitive data, with some data, such as medical history data or password values being the most sensitive, and other data, such as an account balance or email address being less sensitive.

In some non-limiting embodiments or aspects, computing device 101 could employ executable instructions that analyze the context or format of data to be displayed in order to determine whether such data contains sensitive data. An example of such formatting is the social security number assigned to U.S. citizens, which is a nine digit number formatted as a grouping of three digits, followed by a hyphen, followed by two digits, followed by a hyphen, followed by three digits, as "XXX-XX-XXXX" (wherein each "X" character is replaced by a numeric value between 0-9). Upon detecting data of such formats, computing device 101, or a remote server providing such data could hide, mask, obfuscate, securely output, or otherwise modify all or a portion of such data, depending upon the amount of security sought. An example of the foregoing modification is shown at modified social security number 108, wherein all but the final four digits of the number are masked. In some non-limiting embodiments or aspects, computing device 101 could employ executable instructions which parse surrounding fields identifying the data to be output. One non-limiting example of such detection could include parsing the contents of a web page and recognizing a "label" containing the phrase "account number:" or "social security number:" or "password:" which precedes additional data. Detection of such labels would enable software to conclude that the data that follows is likely to be sensitive data without requiring a party to provide any such indication.

Figure 2:
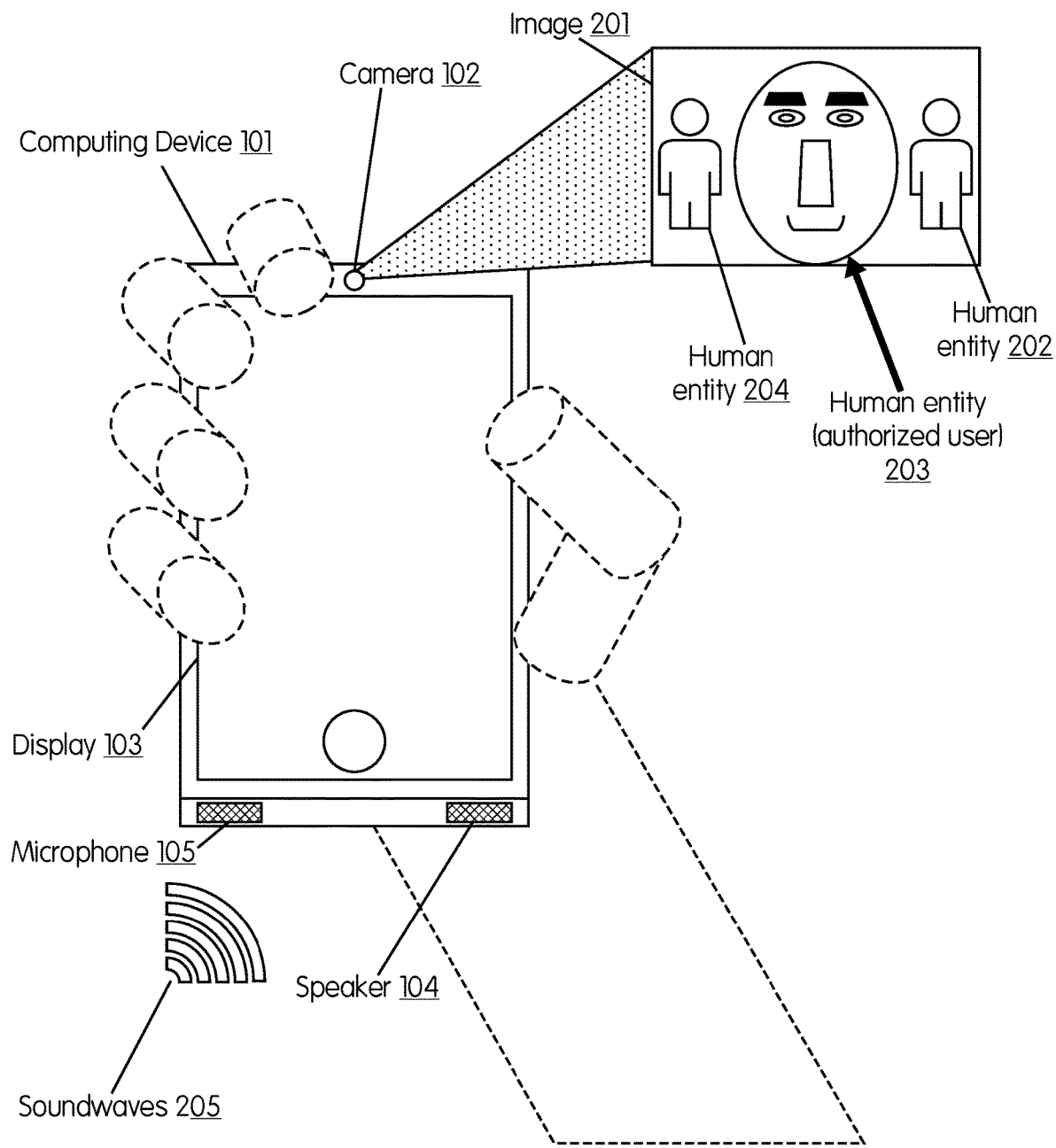
FIG. 2 depicts an illustrative non-limiting example of a computing device determining that its operation is occurring in a public space.

FIG. 2 depicts an illustrative non-limiting example of a computing device determining that its operation is occurring in a public space. In some non-limiting embodiments or aspects, computing device 101 utilizes input received from its various input devices, such as camera 102. In some non-limiting embodiments or aspects, camera 102 may be oriented as "front-facing" to face the user, or "outward facing." Camera 102 may capture image 201 at random or preset intervals, providing image 201 to computing device 101's CPU, which may then execute image analysis software upon image 201. The analysis of image 201 can inform a software-based determination that computing device 101 is being operated in a public space. A non-limiting example of how such a determination could occur may include detecting the presence of multiple human entities depicted in image 201, indicative of their presence in the vicinity of computing device 101. Facial recognition software may be utilized by image analysis software to detect and identify human entity 202, human entity 204, and human entity (authorized user) 203. Some non-limiting examples of such facial recognition software include Facebook's DeepFace system, and Apple's Face ID system. The detection of the presence of human entity 202 and human entity 204, neither of which are authorized or trusted users, may be indicative of computing device 101's use in a public space. Such input received from camera 102 may also be combined with input received from other input devices to further confirm that computing device 101 is being operated in a public space.

In another non-limiting example, computing device 101 may utilize microphone 105 to capture soundwaves 205. Soundwaves 205 may comprise voices or words orally spoken in the vicinity of computing device 101, which may be indicative of the presence of other human entities, thus indicating that computing device 101 is being operated in a public space. Audio analysis software executing on the CPU of computing device 101 may be configured to detect voices, spoken words, or other sound indicative of a public setting, some non-limiting examples of which could include music, construction noise, or the sound of nearby transit, such as buses or trains. In the case of voices carried in soundwaves 205, in some non-limiting embodiments or aspects, audio analysis and/or voice authentication software may distinguish between the voice of an authorized user and that of an unrecognized or unauthorized user to further facilitate the determination of whether computing device 101 is being operated in a public space.

In yet another non-limiting example, computing device 101 may utilize a location module or wireless radio to determine its physical location. If such physical location data is provided in the form of geographical coordinates, software executing on computing device 101's CPU or on the CPU of a remote server may then associate such geographical coordinates with a named physical location, such as a retail store, office, transit station, or other public space. In some non-limiting embodiments or aspects, such association may occur by utilizing computing device 101's wireless radio to connect to a network, such as the Internet, to match geographical coordinates to a named physical location. Such location data and the resulting association with an identifiable space may be further indicative of the operation of computing device 101 in a public space.

It should be appreciated by persons of skill in the art that the aforementioned non-limiting examples of the detection of indications of public spaces may be performed alone or in combination by the computing device itself or by a server. The combined use of such methods may provide a more accurate or reliable determination that a certain location is or is not a public space, but may also further inform the risk of observation by unintended observation of sensitive data if outputted. However, despite operation of a device in a public space, a user may still wish to have sensitive data output. While the user could simply choose to manually override any hiding, masking, obfuscation, or modification of such sensitive data, in some non-limiting embodiments or aspects, computing device 101 may apply different mathematical weights to input received over different input devices in determining whether to hide, obfuscate, mask, or otherwise output sensitive data, and may also consider the intended output method of such sensitive data in making such a determination.

In one non-limiting example, if input is received in the form of soundwaves 205 by microphone 105 and also in the form of images captured by camera 102, which may be a front-facing camera, the mere presence of soundwaves 205, while potentially indicative of operation in a public space, may be outweighed by a lack of indicators detected by camera 102 in determining whether to visually output sensitive data. Such weighting of inputs can also be applied to reflect the likelihood of observation of outputted sensitive data by unintended observers, based on both their proximity to computing device 101 and the output mechanism that will be utilized to output sensitive data. In a non-limiting example, data that is output audibly by a speaker on computing device 101 may be more easily heard/observed by an unintended human entity within a certain proximity to computing device 101 than data that is output visually on display 103, due to the need for a "line-of-sight" to observe display 103, as opposed to soundwaves, which can be heard/observed by nearly anyone within a certain proximity. While inputs received on any one input device may be indicative of operation in a public space, in some non-limiting embodiments or aspects, computing device 101 may apply weights to each input indicative of the proximity of other individuals in a public space, thus further indicative of a likelihood of observation of outputted sensitive data by unintended recipients, as depicted in Table 1 below.

TABLE 1

| Device Name | Input Device Type | Weight |
|---|---|---|
| dev1 | Front-facing camera | 0.4 |
| dev2 | Microphone | 0.3 |
| dev3 | GPS location module | 0.2 |
| dev4 | Wireless radio | 0.1 |

The following pseudo-code snippet is an illustrative and non-limiting example of one way in which computing device 101 may apply weighted inputs, such as those shown in Table 1 to determine whether to output unmodified sensitive data, if a corresponding threshold is reached.

Pseudo-Code Snippet 1

```
likelihood_of_public_space = dev1.Weight + dev2.Weight + dev3.Weight + dev4.Weight;
if (likelihood_of_public_space >= 0.3) {
    // threshold value of 0.3
    string modified_data = modify(sensitivedata);
    output(modified_data);
    // assume modify( ) takes parameter sensitive data and returns
    modified data
}
else {
    output(sensitivedata);
    // data to be output is not hidden, masked, obfuscated, modified
}
```

In the above example snippet, a total weighted value of 0.3 or higher would trigger hiding, masking, obfuscating, or otherwise modifying sensitive data prior to outputting. Thus, input individually captured by the GPS location module or the wireless radio in this example would require an additional input captured by another device in order to trigger hiding, masking, obfuscating, or otherwise modifying output. In some non-limiting embodiments or aspects, computing device 101 may also apply similar weights to the output device and associated method of output reflective of the likelihood of interception and/or observation by unintended parties, and utilize similar logic to determine whether or how to output such data.

Figure 3:
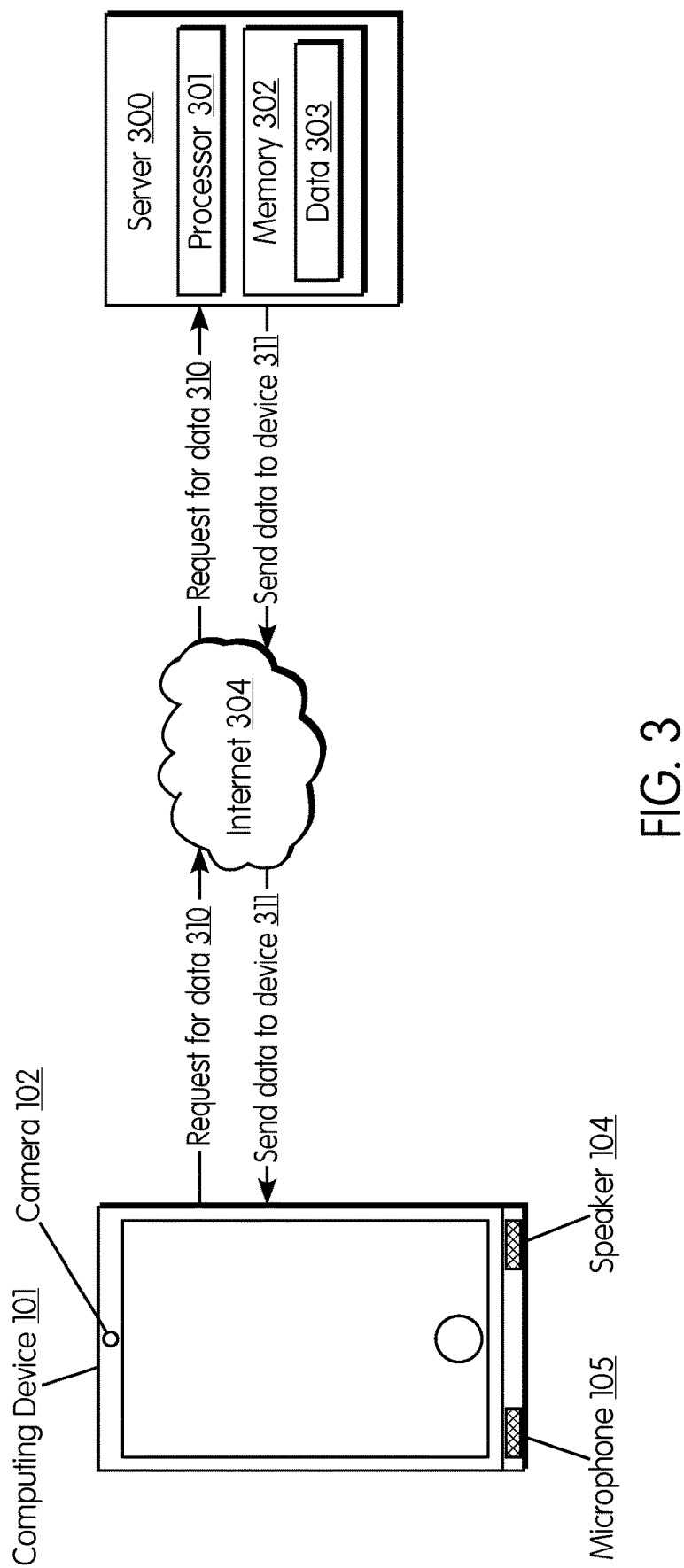
FIG. 3 depicts an illustrative non-limiting example of a system for requesting data that includes sensitive data intended for output.

FIG. 3 depicts an illustrative non-limiting example of a system for requesting data that includes sensitive data intended for output. In some non-limiting embodiments or aspects, the user of computing device 101 may wish to access a data item stored at a remote location, such as server 300, which may contain a processor 301 and memory 302 containing data 303. In some non-limiting embodiments or aspects, server 300 may be operated by entities such as financial institutions, insurance providers, healthcare providers, email systems, tax authorities, social networks, or any other holder of sensitive data. In some non-limiting embodiments or aspects, computing device 101 may utilize a wireless radio or other network interface to send request for data 310 over Internet 304 to server 300. Upon receipt of request for data 310, processor 301 in server 300 may retrieve data 303 from its memory 302, and may optionally analyze it to determine whether the requested data contains sensitive data, and if so, processor 301 may modify at least a portion of the sensitive data to create modified data, and at 311, may send that modified data to computing device 101 over Internet 304.

In some non-limiting embodiments or aspects, processor 301 in server 300 may retrieve data 303 from its memory 302, and may send data 303 to computing device 101 at step 311 without analyzing data 303 to determine if it contains sensitive data. Upon receipt of data 303, and if the data 303 was not modified by server 300, computing device 101 may optionally perform analysis prior to outputting data 303 to determine if data 303 contains sensitive data. Prior to outputting data 303, computing device 101 may determine whether computing device 101 is being operated in a public space, and if so, computing device 101 may hide, obfuscate, mask, modify, securely output, or perform any combination thereof, and may then output the resulting modified data.

FIG. 4 depicts various illustrative non-limiting examples of securing sensitive data for output. Sensitive data 401 may be a nine digit U.S. social security number, which is shown in its unmodified state with hyphens between the first three digits and the middle two digits, and then an additional hyphen shown between the middle two digits and the final four digits. Sensitive data 401 could be completely modified, to yield the string shown at 402, but with its format preserved, such that the hyphenation between the numbers remains. It should be appreciated by persons of skill in the art that while the "X" character is used to denote a particular number in the examples depicted in FIG. 4, any other suitable character may be used. Partial modification 403 depicts an alternative modification to sensitive data 401, wherein the original value's format is preserved, along with the last four digits unmodified, with all prior digits masked using the "X" character. Sensitive data 401 may also be completely hidden, as shown at 404, wherein no values, hyphenation, or formatting are preserved. In such instances, the use of a placeholder character, such as the "X" used at 402 and 403, is optional and unnecessary, and 404 could instead be left entirely blank. It should be appreciated by persons of skill in the art that numerous techniques are possible for hiding, masking, obfuscating, or otherwise modifying sensitive data, including encryption, tokenization, or other such methods to accomplish the goals set forth herein.

Figure 5:
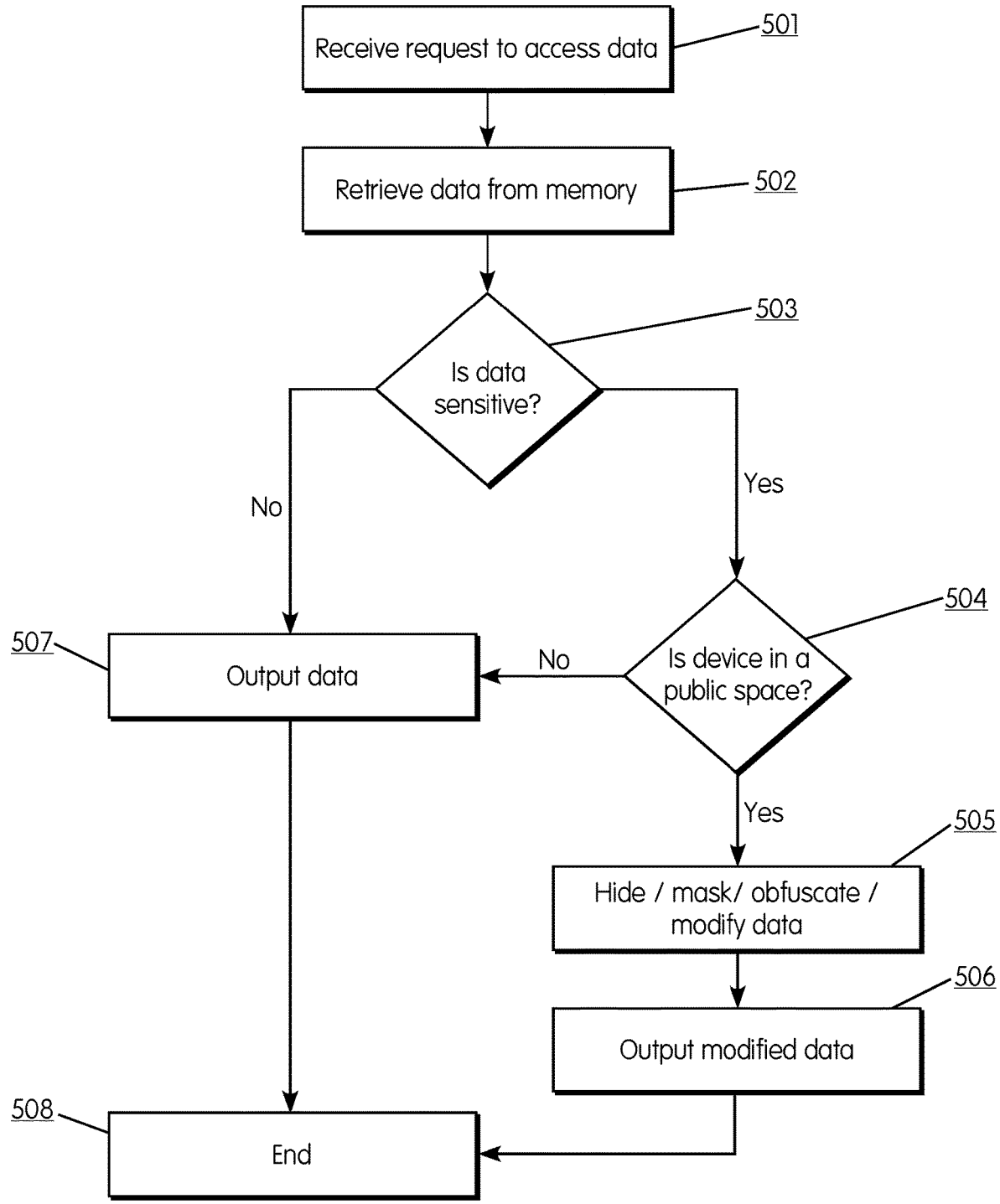
FIG. 5 depicts an illustrative non-limiting example of a decision tree configured to implement a system, method, and/or process in accordance with some non-limiting embodiments or aspects of the present disclosure.

FIG. 5 depicts an illustrative non-limiting example of a flow and decision tree configured to implement a system, method, and/or process in accordance with some non-limiting embodiments or aspects of the present disclosure. It should be appreciated that the steps shown in FIG. 5 could be performed by any entity, and need not all be performed by the same entity, and could in some instances be performed in a different order.

At step 501, a request is received to access data. This request could correspond to data that is stored locally on a user's computing device, or remotely. At step 502, the requested data is retrieved from a memory, and at step 503, analysis must be performed on the data to determine if it is sensitive data. Numerous techniques have been described herein to determine if the data is or contains sensitive data, some non-limiting examples of which include metadata analysis, the use of flags indicative of sensitive data, parsing of the data itself and comparison against known formats and patterns of sensitive data, and/or consideration of context and surrounding data.

If the data is determined not to be or contain sensitive data, at step 507, the data can be output in its unmodified form, and the flow will proceed to end at step 508. If the data is or does contain sensitive data, as determined at step 503, then at step 504, a determination must be made as to whether the device which will be used to output the data is being operated in a public space. In some non-limiting embodiments or aspects, step 504 may also include determining whether the particular method of output of the sensitive data is likely to result in interception or observation by unintended parties in the vicinity of the output device.

As previously described herein, numerous techniques exist for determining whether the device is being operated in a public space, including thorough analysis of input received through input devices. If the device is determined not to be operating in a public space, then the process can proceed to output data at step 507 and the flow may end at step 508. If, however, the device is being operated in a public space, and the data is sensitive data, then at step 505, the data may be hidden, masked, obfuscated, or otherwise modified to create modified data. Modified data can then be output at step 506 by an output device, and the flow may then end at step 508.

It should be understood and appreciated by a person of skill in the art that nothing in the above is intended to limit the functionality and structures described herein. The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents. One or more features from any non-limiting embodiments or aspects may be combined with one or more features of any other embodiment or aspect without departing from the scope of the disclosure. A recitation of "a," "an," or "the" is intended to mean "one or more" unless specifically indicated to the contrary. All patents, patent applications, publications, and descriptions mentioned above are herein incorporated by reference in their entirety for all purposes. None is admitted to be prior art.

The invention claimed is:

1. A method for securing output, comprising:
accessing, by a computing device, a data item;
determining, by at least one processor, that the data item contains sensitive information;
determining, by at least one processor, based on at least one of sound data and image data included in at least one input to the computing device, that the computing device is located in a public space by detecting a human entity in a proximity to the computing device;
modifying, by at least one processor, at least a portion of the data item to generate a modified data item; and
outputting, by the computing device, the modified data item.

2. The method of claim 1, wherein the step of outputting, by the computing device, the modified data item comprises displaying the modified data item on a user interface, audibly reciting the modified data item on a speaker, printing the modified data item using a printer, or any combination thereof.

3. The method of claim 1, wherein the step of determining, by the at least one processor, that the data item contains sensitive information comprises analyzing a metadata item associated with the data item, comparing a format of the data item to a recognized sensitive information format, or any combination thereof.

4. The method of claim 1, wherein the computing device comprises at least one of the following: the at least one processor determining that the data item contains sensitive information; the at least one processor determining, using at least one input to the computing device, that the computing device is located in a public space; the at least one processor modifying at least a portion of the data item to generate a modified data item; or any combination thereof.

5. The method of claim 1, wherein at least one of the at least one processors is arranged in a remote server in communication with the computing device.

6. The method of claim 1, wherein the at least one input to the computing device further comprises network data, location data, or any combination thereof.

7. The method of claim 1, wherein the at least one input to the computing device is obtained by at least one of the following: a microphone, a camera, or any combination thereof.

8. The method of claim 7, wherein the step of determining, by the at least one processor, that the computing device is located in the public space further comprises:
   applying at least one of a plurality of mathematical weights to each of the at least one input to generate weighted inputs; and
   comparing a sum of the weighted inputs against a threshold.

9. The method of claim 1, further comprising determining, by the at least one processor, based on the at least one of the sound data and the image data included in the at least one input to the computing device, that the human entity is not a trusted user of the computing device.

10. The method of claim 9, wherein determining that the human entity is not a trusted user of the computing device includes applying at least one of a facial recognition technique and a voice authentication technique to the at least one of the sound data and the image data included in the at least one input to the computing device.

11. The method of claim 1, further comprising: receiving, by the computing device, a user command to output the sensitive information, and outputting, by the computing device, the sensitive information.

12. The method of claim 1, wherein the step of modifying, by the at least one processor, the at least a portion of the data item is performed by a server.

13. The method of claim 1, wherein the step of determining, by the at least one processor, that the data item contains sensitive information is performed by a server.

14. A system for securing output, comprising:
   a computing device; and
   a server configured to:
      receive, from the computing device, a request for data associated with a user of the computing device, wherein the request includes an indication that the computing device is located in a public space;
      retrieve the data from a memory;
      determine that the data includes sensitive information;
      modify at least one portion of the sensitive information to generate modified data when the request includes the indication that the computing device is located in the public space; and
      send the modified data to the computing device;
   wherein the computing device is configured to:
      determine that the computing device is located in the public space by detecting, based on at least one of sound data and image data included in at least one input to the computing device, a human entity in a proximity to the computing device;
      send, to the server, the request for the data that is associated with the user of the computing device;
      receive the modified data from the server; and
      output the modified data.

15. The system of claim 14, wherein the output of the modified data comprises displaying, on a user interface, the modified data.

16. The system of claim 14, wherein the output of the modified data comprises audibly playing, on a speaker, the modified data.

17. The system of claim 14, wherein the modified data is generated by hiding, obfuscating, masking, or any combination thereof, the at least one portion of the sensitive information.

18. The system of claim 14, wherein the at least one input further comprises at least one of the following: network data, location data, or any combination thereof.

19. A computing device comprising:
   a processor;
   an input device;
   a memory including instructions that when executed by the processor cause the computing device to:
      receive a request to output data;
      determine that the data contains sensitive information;
      analyze at least one of sound data and image data included in an input received through the input device to determine that the computing device is in a public space by detecting a human entity in a proximity to the computing device; and
      securely output the sensitive information.

20. The computing device of claim 19, wherein the input device comprises at least one of the following: a microphone, a camera, or any combination thereof, and wherein the step of securely outputting the sensitive information comprises adjusting visibility of a display.

* * * * *